United States Patent [19]

Marshall

[11] Patent Number: 4,530,519
[45] Date of Patent: Jul. 23, 1985

[54] VEHICLE CAR DOOR PROTECTION SYSTEM

[76] Inventor: Donald J. Marshall, 8440 Sunset Blvd., #314, Los Angeles, Calif. 90069

[21] Appl. No.: 406,736

[22] Filed: Aug. 9, 1982

[51] Int. Cl.³ .............. B60R 19/00; B60J 11/00; B61D 36/00
[52] U.S. Cl. ................... 280/770; 293/21; 296/117
[58] Field of Search ............ 280/770; 296/207, 219, 296/117, 136, 105; 293/118, 119, 123, 126, 128, 21

[56] References Cited

U.S. PATENT DOCUMENTS

| | | | |
|---|---|---|---|
| 1,903,240 | 3/1933 | Mayer | 296/105 |
| 2,460,394 | 2/1949 | Peatross | 280/770 |
| 2,559,310 | 7/1951 | McNavage | 296/105 |
| 2,754,149 | 7/1956 | McGrath | 296/117 |
| 3,033,609 | 5/1962 | Golde | 296/117 |
| 3,563,594 | 2/1971 | London | 293/128 |
| 3,704,037 | 11/1972 | Glassberg | 293/128 |
| 3,718,357 | 2/1973 | Hertzell | 293/21 |

FOREIGN PATENT DOCUMENTS

2823951 12/1979 Fed. Rep. of Germany ...... 293/126

Primary Examiner—Richard A. Bertsch
Attorney, Agent, or Firm—Nilsson, Robbins, Dalgarn, Berliner, Carson & Wurst

[57] ABSTRACT

A system for protecting the doors and part of the side panels of a stationary vehicle includes a sheet-like shield that is selectively power actuated from a recessed position within the body of the vehicle to an extended position to protect the vehicle's door panels and part of the side panels. The shield, formed of flexible, yet rigid, material, is engaged by a motor-driven spindle mounted within a cylindrical housing. Projecting members, affixed to the inside of the shield, include end portions that are slidably housed within tracks secured to the door frame to provide paths extending from the cylindrical housing (located within the vehicle's rocker panel) so that, upon activating of the motor, the shield is unwound from the spindle and guided to a side covering position.

4 Claims, 5 Drawing Figures

FIG. 2
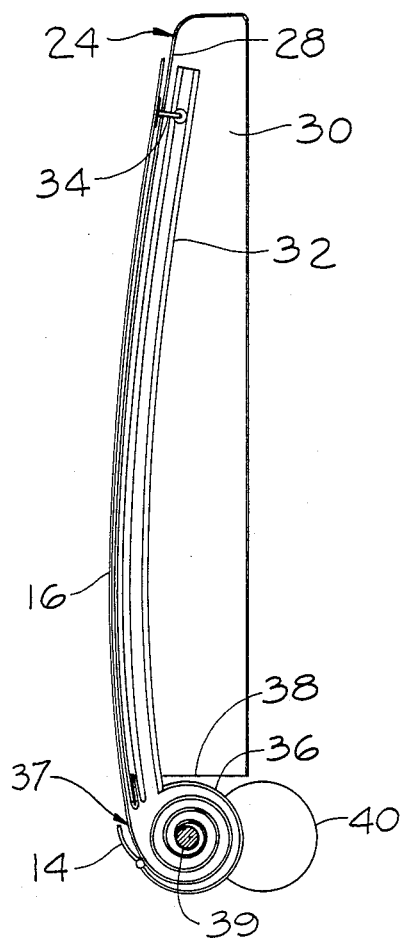
FIG. 3
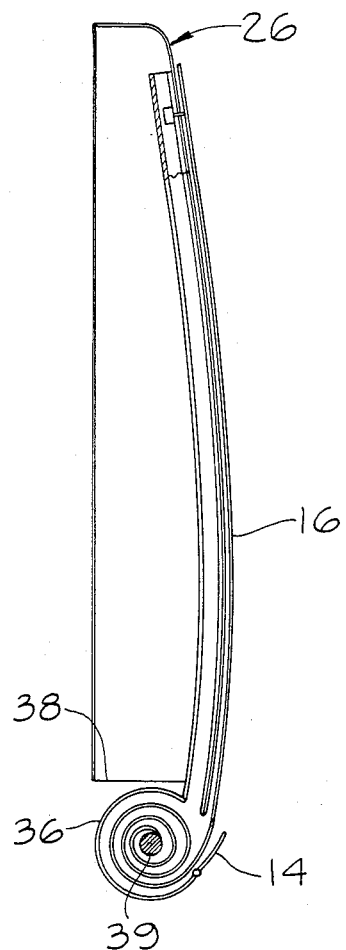
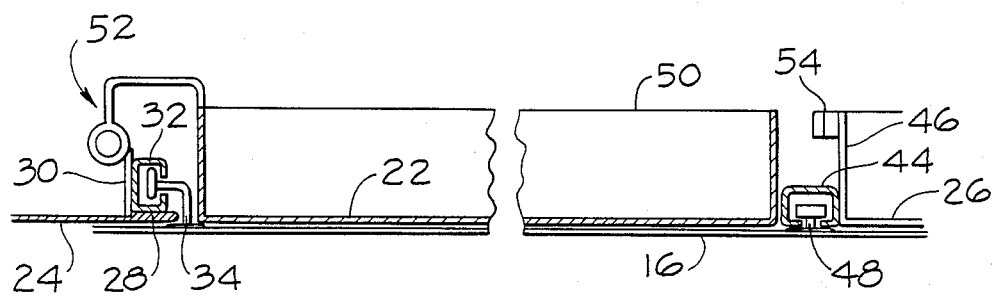
FIG. 4

VEHICLE CAR DOOR PROTECTION SYSTEM

BACKGROUND OF THE INVENTION

1. Field of the Invention

The present invention relates to means for protecting a stationary vehicle. In particular, this invention pertains to apparatus especially adapted to protect the finish of the doors and parts of the front and quarter panels of a parked vehicle from damage of the type which commonly occurs in parking lots as a result of vandalism and close vehicle spacing.

2. Description of the Prior Art

Automobiles often serve their owners both as a means of transportation and as a source of pride of ownwership and for want of a better term, "status". Classic and luxury automobiles, for example, commonly represent substantial investments on the part of their owners. Unfortunately, the vehicle's essential transportation function often exposes it to hazards of a sort that can seriously degrade its value as a "collectible".

While the automotive vehicle is relatively safe from damge when stored in a single car garage, everyday travel will often entail parking and temporary storage in a relatively exposed environment. Few parking lots are enclosed; thus, it may be exposed to intentional or unintentional bangs or knocks from other autos, minor vandalism, and the like which, over time, can take a heavy toll on a quality finish. Further, in an enclosed structure, the tight packing of automobiles required for maximum parking revenue enhances the risk that the door of an adjacent vehicle, carelessly opened, will dent a side and door panel.

Vehicle door and side panels are quite vulnerable to minor denting of the type described above. As a result, efforts, most notably tarpaulins and rubber molding, having been made to minimize the vulnerability of the door and side panels of the unattended vehicle to the above-described dangers.

A tarpaulin is usually designed to cover the entire automobile and, hence, requires substantial effort and time to affix to the automobile. Additionally, its large size creates a storage problem requiring the dedication of substantial space within the vehicle. Further, tarpaulins are generally fabricated of flimsy, cloth-like material which provides only minimal protection against even minor bumps. Rubber or other elastomeric molding affixed to the side of an automobile, often in a generally horizontal plane, leaves large areas of the side panels fully exposed and presents an unattractive appearance that often detracts from the design and appearance of the car. Thus, its use creates problems both for the owner and for the designer. Over time molded pieces may become brittle from exposure to the elements and crack, causing the owner to incur substantial replacement costs.

SUMMARY OF THE INVENTION

The foregoing and other problems of the prior art are addressed by the present invention wherein there is provided a system for protecting the sides of an unattended vehicle. Such system includes a sheet-like shield and means for positioning such shield to selectively cover a portion of the side of the vehicle.

The foregoing and additional features of the invention will become apparent from the detailed description which follows. This description is accompanied by a set of drawing figures. Numerals identify the elements of the figures, like numerals corresponding to like parts throughout. Reference is made in the description to such numerals, the description thereby providing an index to the figures.

BRIEF DESCRIPTION OF THE DRAWINGS

FIG. 2 is a partial sectional view taken along the line 2—2 of FIG. 1B for the purpose of illustrating various features of the invention associated with the fender panel and front door jamb of the vehicle of the preceding figure;

FIG. 3 is a partial sectional view taken along the line 3—3 of FIG. 1B illustrating various fetures of the invention associated with the rear quarter panel and rear door jamb of the vehicle; and FIG. 4 is a cross-sectional view of a portion of the side of a vehicle taken along the line 4—4 of FIG. 1B.

DETAILED DESCRIPTION

Figure 1A:
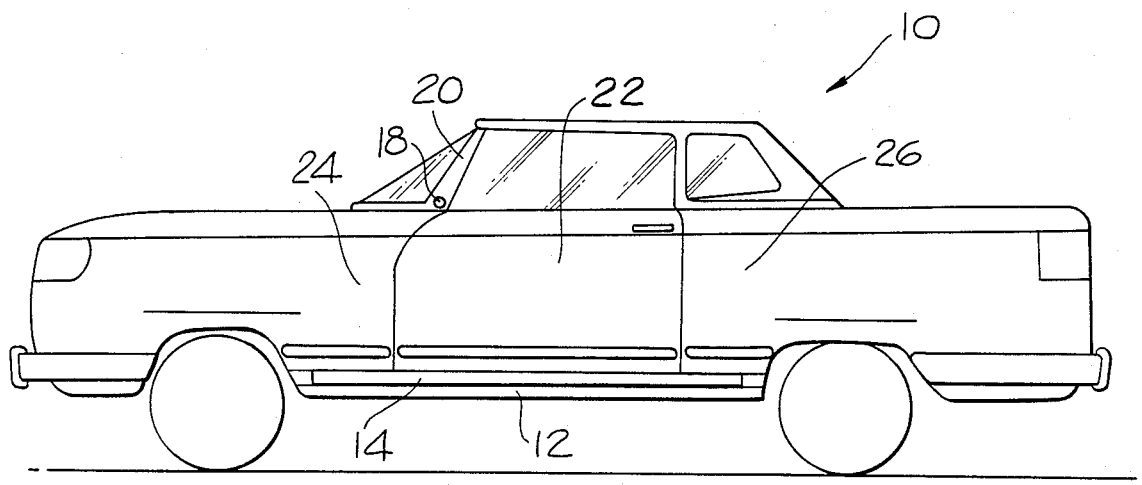
FIGS. 1A and 1B are side views of an automobile including apparatus according to the invention in its recessed and extended modes or positions, respectively.
Figure 1B:
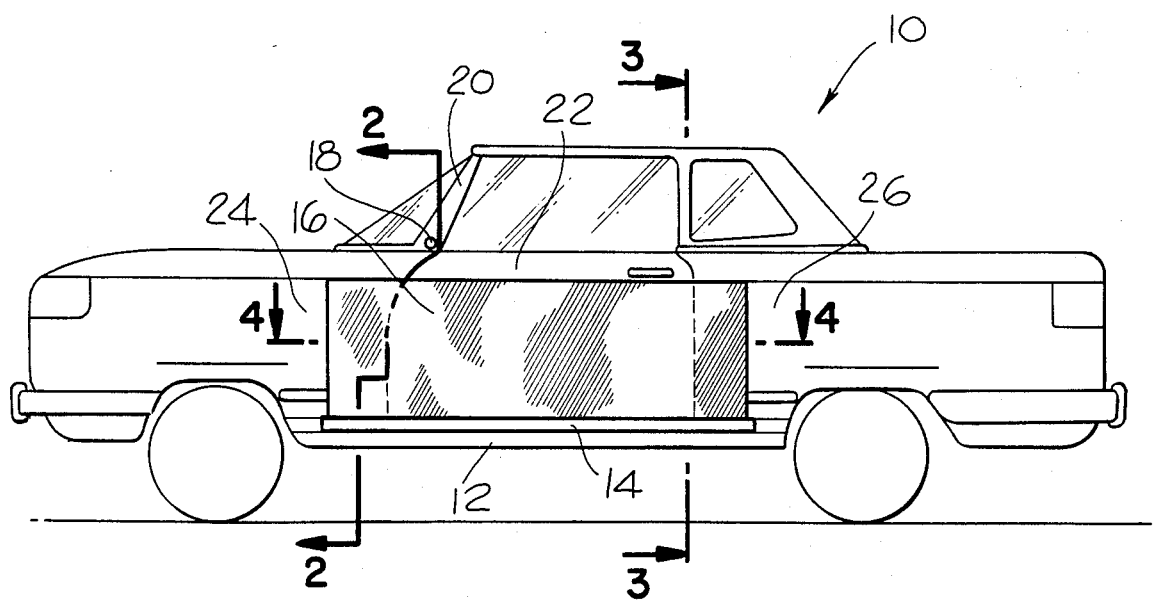

Turning now to the drawings, FIGS. 1A and 1B are side views of an automobile 10 incorporating a vehicle car door protection system in accordance with the invention. In FIG. 1A, the flexible protective shield that provides protection against accidental damage and vandalism to the vehicle cannot be seen as it is recessed within the rocker panel 12. A hinged chrome piece 14 covers the opening between the rocker panel 12 and the bottom edges of the vehicle side panels. Such opening provides a passageway through which the shield 16 travels when actuated from the recessed position shown in FIG. 1A to the extended, vehicle protective position, shown in FIG. 1B.

When the flexible shield 16 is actuated from its recessed position to its extended position, it is unfurled from a motor driven spindle (shown in FIGS. 2 and 3). The spindle is geared to a bidirectional motor which is also located within the rocker panel 12. The motor and, hence, rotation of the spindle, are controlled by a key switch 18. The switch 18, which is seen in FIGS. 1A and 1B to be located on a portion of a front door frame 20, is accessible to the driver upon exiting the vehicle. As will be seen in the discussion to follow, such exterior accessibility allows the driver to actuate the motor-driven spindle after he has parked his automobile and is, in fact, an essential feature of the invention as implemented. The presence of an exterior switch may appear somewhat unsightly and, therefore, a latched panel may be provided, somewhat in the manner of a covering for a gas cap, to conceal the switch 18. Such a covering additionally provides a measure of protection for the system from vandalism.

Various side panels of the automobile 10 are protected by and function as points of attachment for the elements of the vehicle door protection system. Such side panels include a door panel 22, a part of the front or fender panel 24 and a part of the rear quarter panel 26. The panels 22, 24 and 26 are generally formed of stamped sheet metal. Commonly the sheet metal employed is relatively thin, rendering such panels vulnerable to even minor bumps.

FIG. 2 is a view partially in enlarged cross section taken along the line 2—2 of FIG. 1B. As is seen, the fender panel 24, which is bolted to a front door jamb 30, is seen to have an outwardly-convex shape that terminates in a rolled edge 28. A front track 32, which is a significant feature of the invention, provides a guideway for a front projection 34 fixed to the inner side of the shield. The track 32 may be spot welded or otherwise mounted to the rolled edge 28 and/or to the front door jamb 30.

The track 32 guides the projection 34, which includes an enlarged or flanged end that is captured within the track 32 and functions as a "runner", thereby guiding the front portion of the shield, under the influence of the system motor, between the recessed and extended positions shown in FIGS. 1A and 1B, respectively. The track is continuous along the interior of the front door jamb 30 and, at its lower end, joins a cylindrical housing 36 (which includes a lengthwise slot 37) that can be bolted or welded to the bottom of the vehicle door sill 38. A spindle 39, referenced above, is mounted within the housing 38 and, as mentioned, is geared to the driveshaft of a bidirectional motor 40 that is actuated by the positioning of the key switch 18.

The shield 12 is formed of a flexible yet sturdy material such as a composite including Naugahyde. In the recessed position of FIG. 1A, the shield 16 is gathered in a roll on the spindle 39. The shield 16 is rolled onto the spindle 39 in response to its counterclockwise rotation (as oriented in FIG. 2) occasioned by appropriate actuation of the motor 40. When the motor 40 is reversed to unroll the shield 16 from the spindle 39, its stiffness is sufficient to push the attached projection up the track 32, guiding the shield 16 to the extended position of FIG. 1B.

As the housing 36, spindle 39 and associated apparatus are enclosed within the rocker panel 12, direct access to the exterior of the side panels is not provided. Some modification of the vehicle 10 may thus be required in adapting the protection system thereto. As is shown in FIGS. 2 and 3, an opening is created between the bottom edges of the side panels and the top of the rocker panel 12 to allow travel of the shield 16 therethrough. As mentioned above, such opening is concealed from view by means of a set of the hinged chrome pieces 14 formerly discussed in conjunction with and shown in FIG. 1A.

FIG. 3 is a view, partially in cross section, taken along the line 3—3 of FIG. 1B. This figure somewhat resembles that of FIG. 2, providing a rearward view along the door frame. As can be seen, a rear track 44 is fixed (either bolted or otherwise secured) to the interior of the rear door jamb 46. A rear projection 48, fixed to the shield 16, provides an indirect slideable connection between track 44 and the rear portion of the shield 16 in the same manner that the front projection 34 and the front track 32 cooperate to provide slideable engagement therebetween. The spindle 39, fixed to the bottom edge of the shield 16 throughout its width, is seen to secure the bottom edge of its rear portion in the same manner as which it secured the bottom edge of its front portion. Thus, the rotation of the spindle 39 causes the flexible shield 16 to be rolled onto or unrolled from the spindle 39 throughout its width. Such unrolling and rolling of the shield 16 is translated into corresponding upward and downward movements thereof guided by the slidable movements of the rear projection 48 within the rear track 44 and front projection 34 within the front track 32. The combined track-guided movements of the shield occur in response to appropriate actuation of the motor 40.

FIG. 4 is a cross-sectional view taken along the line 4—4 of FIG. 1B. As can be seen, the door, including the (outer) door panel 22 and an interior panel 50, is joined to the front portion of the car by a hinge 52. A latch 54 is provided in the rear door jamb 46 for securing the door when closed. It is seen in this figure that, although the door is closed, openings (about 0.32 centimeters each) generally found in automobiles and other vehicles, exist between the door panel 22 and the fender panel 24 and between the door panel 22 and the rear quarter panel 26. These small openings allow passage of the front and rear projections 34 and 48 from the shield 16 and into the front and rear tracks 32 and 44 respectively. As is shown, the front projection 34 includes a right angle bend while the rear projection 48 is straight. The differing geometries of the projections are necessitated by the differing characters of those portions of the vehicle door frame to which the front and rear tracks are mounted. As shown in FIG. 4, the front track 32 is mounted within the corner formed between the rolled edge 28 of the fender panel 24 and the front door jamb 30. Thus, the lengthwise opening along the front track 32 that permits the slideable positioning of the front projection 34 must face rearward, forcing the front projection 34 to be bent to engage the track 32. The rear quarter panel 26 of the vehicle is spot welded to the rear door jamb 46 in such a manner as to allow the rear track 44 to be mounted with its lengthwise opening facing outwardly. Thus, the projection 48 need not be bent to engage the rear track 44 at such opening.

In operation, the driver, after parking, exiting his vehicle and closing the door, inserts a key, which may also serve as the key to the automobile ignition switch, into the exterior switch 18. The switch 18, which includes three positions ("off", clockwise rotation and counterclockwise rotation of the drive shaft of the motor 40), is turned to the appropriate setting for unrolling the shield 16 from the spindle 39. As the sturdy material of the shield 16 is unrolled, upwardly directed forces are exerted upon the front and rear projections 34 and 48. The projections, slideable within the front and rear tracks 32 and 44, respectively, travel upward within these tracks. Thus the shield 16 is guided into the extended position of FIG. 1B as it is unrolled. The driver turns the switch 18 off after the shield is in place. When he returns, he turns the switch to a third position. The opposite rotation of the spindle 39 now pulls the shield 16 down, gathering the flexible material into a roll. The hinged chrome piece 14 opens in response to the pushing force exerted by the shield 16 and close when this force is absent. (i.e. when the shield 16 is retracted and recessed within the rocker panel 12).

Thus it is seen that there has been provided a new and improved system for protecting the finish and, consequently, the valve of an unattended, stationary vehicle. By incorporating a system in accordance with the invention, its owner is assured of enhanced protection against both vandalism and inadvertent damage to what is, most likely, his most valuable personal possession. The motor driven system is put into place with an ease not achieved by present day systems such as the tarpaulin and does not degrade the automobile's design as do in-place systems, such as rubber molding.

While the invention has been described in connection with the preferred embodiment, it will be understood that it is not limited to the particular embodiment disclosed. Rather it is intended to encompass all alternatives, modifications and equivalents which fall within the scope of the appended claims.

What is claimed is:

1. An apparatus for protecting the side of a vehicle comprising:
    a sheet-like shield having a front and rear projection affixed thereto;
    a spindle located in the rocker panel of said vehicle for rolling and unrolling said shield, said shield having an end fixed to said spindle;
    an elongated housing covering said spindle, said housing having an elongated opening which permits said shield to pass therethrough;
    a bidirectional motor located in said rocker panel for turning said spindle; and
    a front and rear track, wherein said front projection is captive within and movable along said front track and said rear projection is captive within and movable along said rear track, said front track being affixed to and extending along the front door jamb of said vehicle, one end of said front track being located in close proximity to said spindle for receiving said front projection and wherein said rear track is affixed to and extends along the rear door jamb, wherein one end of said rear track is located in close proximity to said spindle for receiving said rear projection, said front projection being movable between the gap formed between the front fender panel and the door panel of said vehicle and said rear projection being movable between the gap formed between the rear fender panel and the door panel of said vehicle, said shield having sufficient rigidity to move said projections along said tracks when said shield is rolled and unrolled from said spindle.

2. The apparatus as defined in claim 1 wherein said projections include wheels attached thereto for rolling engagement within said tracks.

3. An apparatus as defined in claim 2 wherein said projections are fixed to said shield in close proximity to the end of said shield which is opposite to the fixed end of said shield.

4. The apparatus as defined in claim 3 wherein said bidirectional motor is controlled by a key switch.

* * * * *